Nov. 17, 1964   W. E. BOTTENBERG   3,157,014
MOWING AND WINDROWING MACHINE
Filed Sept. 10, 1962   2 Sheets-Sheet 1
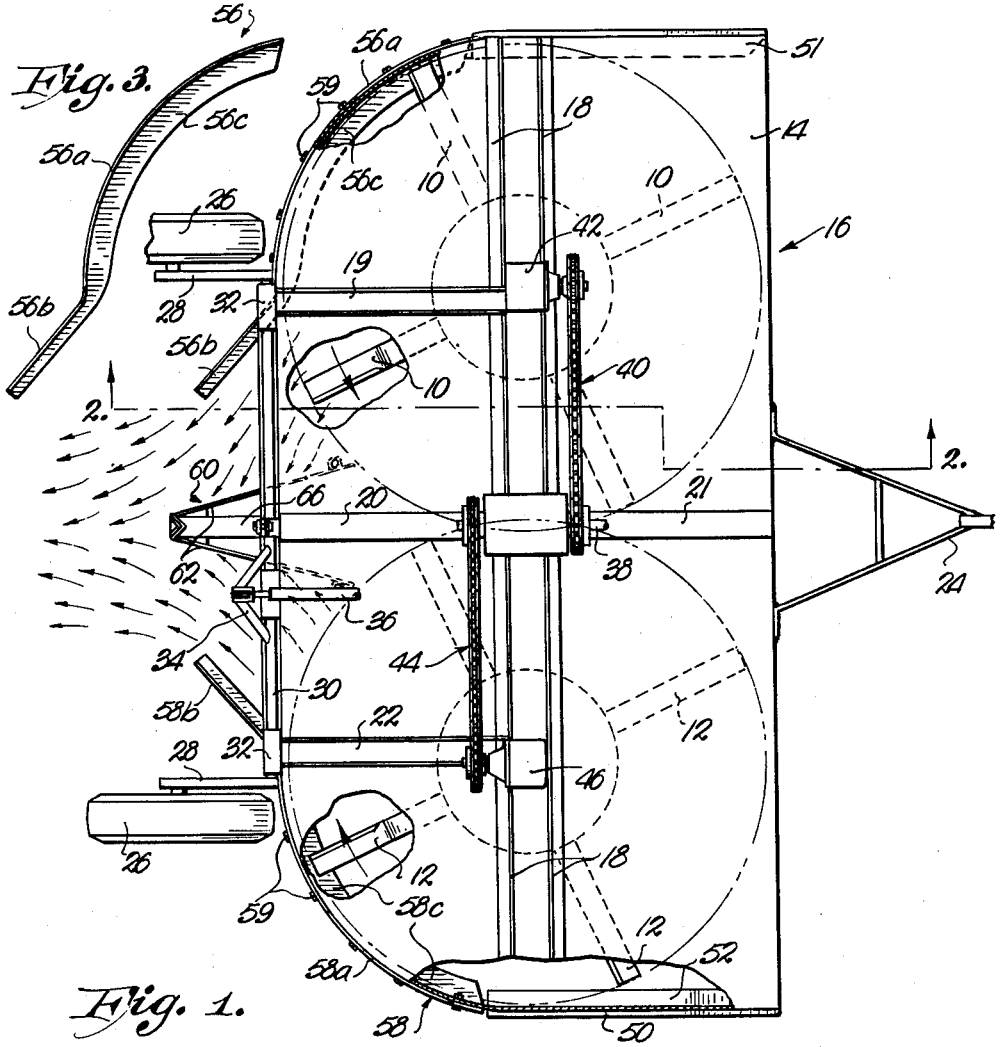
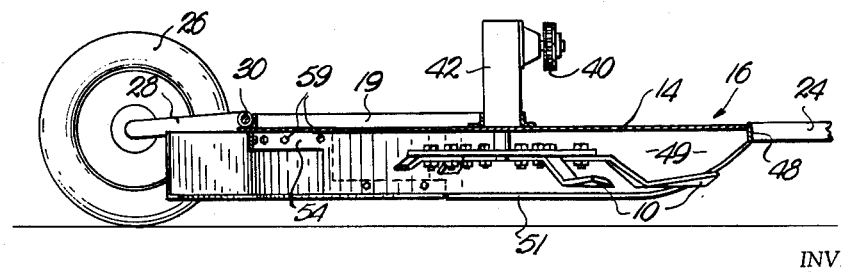
INVENTOR.
Warren E. Bottenberg
BY
Scofield, Kolkjer, Scofield & Lowe
ATTORNEYS.

Nov. 17, 1964 W. E. BOTTENBERG 3,157,014
MOWING AND WINDROWING MACHINE
Filed Sept. 10, 1962 2 Sheets-Sheet 2

INVENTOR.
Warren E. Bottenberg
BY
Schofield, Kokjer, Schofield & Lowe
ATTORNEYS.

United States Patent Office 3,157,014
Patented Nov. 17, 1964

3,157,014
MOWING AND WINDROWING MACHINE
Warren E. Bottenberg, Holton, Kans., assignor to B-M-B Company, Inc., a corporation of Kansas
Filed Sept. 10, 1962, Ser. No. 222,479
19 Claims. (Cl. 56—6)

The present invention relates in general to agricultural apparatus, and it deals more particularly with machines for mowing and windrowing hay or like growth material in a single operation.

An object of the invention is to provide an improved rotary mower which will cut a wide swath as it traverses the field, and which automatically windrows the cut material in the normal course of mowing.

Another object of the invention is to provide a rotary mower having dual mowing rotors positioned side by side, together wtih attachments for converting said mower into a combined mowing and windrowing machine.

Another object is to provide a mower having dual mowing rotors which discharge the cut material in such fashion as to form a single windrow common to both rotors, an important feature residing in the fact that the cut material is delivered to the windrow with a minimum of recutting, shredding and bruising of the type that tends to impair the nutrient content of the product.

A further object is to provide a windrowing attachment for a mower having optional means for spreading the windrow for purposes of aeration, if desired.

Other and further objects of the invention together with features of novelty whereby the objects are achieved will appear in the course of the following description.

In the drawings which form a part of the specification and are to be read in conjunction therewith, and in which like reference numerals refer to like parts in the various views:

FIG. 1 is a plan view of a dual rotor mower equipped for windrowing according to the inventoin, parts being broken away for purposes of illustration;

FIG. 2 is a cross-sectional view taken along the line 2—2 of FIG. 1 in the direction of the arrows;

FIG. 3 is a plan view of a detachable skirt forming part of the windrowing apparatus, said skirt being removable from the mower housing when it is not desired to windrow the cut material;

Figure 4:
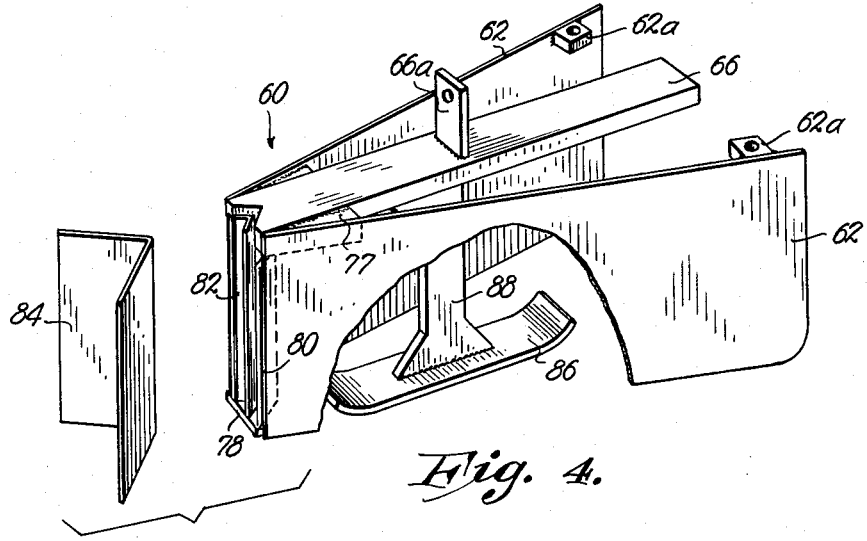
FIG. 4 is a perspective view of a detachable baffle and aerating accessory forming part of the windrowing apparatus.

Referring more particularly to FIGS. 1 and 2, the mower shown therein employs two laterally spaced mowing rotors, one having blades 10 and the other having blades 12. The two rotors are carried below deck 14 of the mower housing 16, the deck being shaped as shown in FIG. 1 and having reinforcing frame members 18, 19, 20, 21 and 22 welded to its upper surface.

A tongue 24 is provided at the front of the housing for connection to a farm tractor or other towing vehicle (not shown) and the rear of the housing is carried by trailing ground wheels 26. These wheels are mounted on arms 28 which extend rearwardly from opposite ends of the rock shaft 30. The rock shaft is journaled in aligned sleeve bearings 32 and has an upstanding bifurcated crank arm 34. Suitable adjustment mechanism, not shown, connected to the crank arm by means of a crank 36 is arranged to shift the arm forwardly or rearwardly as desired for the purpose of raising or lowering wheels 26, thereby to control the elevation of the mowing rotors above the ground.

In operation the two mowing rotors turn in opposite directions, blades 10 traveling counterclockwise as seen in FIG. 1, while blades 12 travel clockwise. For the purpose of turning the rotors, shaft 38 is connected to any suitable source of power, conveniently the power take-off of the towing tractor. From this shaft, power is transmitted through a chain and sprocket drive 40 and a gear box 42 to one of the mowing rotors, while a corresponding chain and sprocket drive 44 and a gear box 46 serves to transmit power to the other rotor for turning same.

Except for a narrow flange 48 reinforcing the leading edge of the mower housing, the cutting region below deck 14 is open at the front in order to facilitate entry of standing grass or other vegetation into the cutting region as the housing advances across the field.

The sides of the cutting region are enclosed, however, by a pair of skirts 49 and 50 rigidly depending from opposite lateral edges of the deck. The skirts have longitudinally extending ground skids or runners 51 and 52 welded to their lowermost edges, the forward extremities of the skids being curved upwardly as shown in FIG. 2. The skirting continues rearwardly and inwardly in an arc following the marginal curvature of the rear portion of deck 14, but across the rear of the housing the permanent skirt is cut away so as to leave only a narrow flange 54.

Detachable auxiliary skirts 56 and 58 are secured to this flange by bolts 59, each auxiliary skirt having an arcuate portion (56a and 58a) following the curvature of the housing, and an extension (56b and 58b) projecting rearwardly of the housing at an angle, as best seen in FIGS. 1 and 3. Horizontal flanges (56c and 58c) are provided on the lowermost edges of the respective skirts, these lying in the same plane as skids 51 and 52 so as to form a continuous inwardly extending ledge beneath the tips of the cutting blades as they travel rearwardly along the sides of the housing and toward the central opening formed by extensions 56b and 58b.

The latter opening is divided into two sections by a removable baffle unit 60 which extends in a generally longitudinal direction both fore and aft of the rear edge of the housing 16. More particularly, the baffle comprises a pair of rearwardly converging side plates 62 having apertured lugs 62a at their forward ends registering with apertures in the deck 14. Bolts 64 extending through these holes support the front of the baffle unit.

Between plates 62 there is an elongated rectangular bar or tongue 66 having an upstanding apertured lug 66a about midway between its ends. The forward portion of the bar is received in a longitudinal guideway 68 and the rear portion projects aft of the mower housing to support the rear ends of plate 62. Guideway 68 conveniently is formed by a U-shaped channel 70 whose upper edges are welded to the underside of deck 14. Lug 66a is secured by a bolt 72 to a corresponding apertured lug 74 to hold bar 66 in the guide channel, lug 74 being welded on a sleeve 76 which in turn is welded to the center rear of the mower housing.

A pair of wedge-shaped gussets 77 between bar 66 and the upper rear portions of the baffle plates 62 (see FIGS. 4 and 5) are welded to both, and serve to support the trailing end of the baffle unit. The trailing end is further reinforced and strengthened by a horizontal base plate 78 whose lateral edges are welded to the respective baffle plates. Also, between the spaced apart trailing ends of plate 62 there is an upstanding angle member 80 whose lateral edges are welded to the respective plates and whose lower end is welded to the base plate 78.

A second upstanding angle member 82 is welded to base plate 78 in a position spaced slightly behind member 80 so that there is a vertical slot or socket of V-shaped cross section between the two. The rear of supporting bar 66 is notched so that the upper end of this slot is open to receive a V-shaped spreader member 84 whereby the latter can be inserted simply by lowering it into the slot to occupy the position illustrated in FIGS. 5 and 6. To remove member 84, it needs only to be lifted out of the slot or socket as indicated by the dotted lines in FIG. 6.

Referring to FIG. 1, my apparatus can be used without spreader 84 in windrowing cut hay or like vegetation as the mowing takes place. It will be evident that the skirt extension 56b and the proximate side plate 62 of baffle unit 60 form a discharge chute for material cut by blades 10, while the corresponding skirt extension 58b and the opposite side plate 62 of the baffle unit form a discharge chute for material cut by blades 12. The center line of each chute is approximately radial to the center of rotation of its associated cutting rotor, and the side walls of that chute converge slightly toward one another in a rearward direction. Also, the two chutes converge rearwardly toward one another to form a single windrow. As will be seen, the forward extremities of the baffle plate 62 lie just outside the path traveled by the tips of the blades on the respective rotors.

In operation, the cutting rotors tend to generate circumferential air streams traveling in the same direction as the blades. This, together with the sweeping action of the blades serves first to carry the cut material generally outward toward the side skirts 49 and 50, then rearwardly along the inside faces of the skirts, causing it finally to be discharged through the two chutes as indicated by arrows in FIG. 1 so that a single windrow is formed having a width approximately equal to the distance between the trailing end of skirts 56b and 58b.

Baffle plates 62 are important in directing the material into the windrow and preventing "cross throw" and re-cutting of the material in the discharge region. The angular orientation of plates 62 has been found to be excellently suited to deflecting cut material in the desired direction, and the manner in which the two plates converge rearwardly is such that the baffle unit advances smoothly out of the windrow as the latter is laid down without disturbing or molesting the windrow, leaving a track, or inducing any irregularity due to choking of material in the throat or chute as it is delivered to the windrow.

Figure 5:
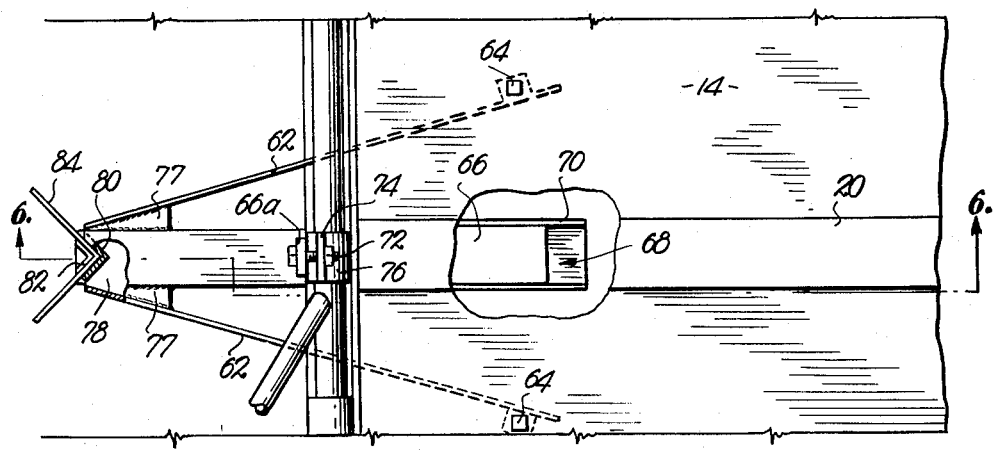
FIG. 5 is an enlarged plan view of the center rear portion of the mower housing, showing the windrowing baffle and aeration accessory mounted thereon.
Figure 6:
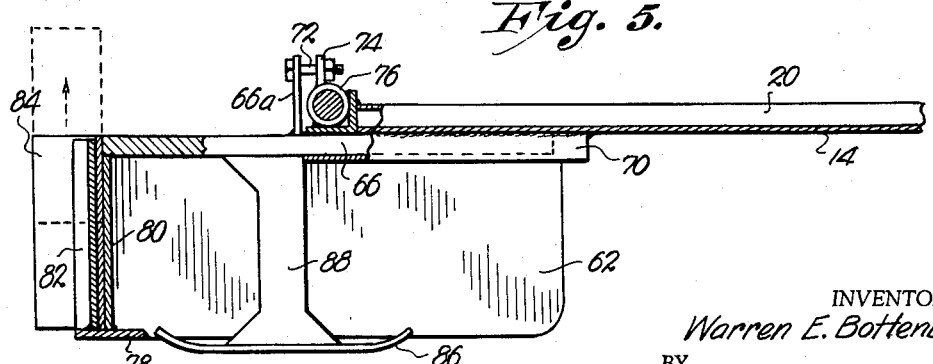
FIG. 6 is a cross-sectional view taken approximately along the line 6—6 of FIG. 5 in the direction of the arrows.

In order to enhance ventilation and drying of the windrowed hay it sometimes is desirable to employ the spreader 84 as shown in FIGS. 5 and 6. This leaves the center of the windrow more loose and open than when my apparatus is used without it (FIG. 1) and thus improves aeration of the material.

Not only can the spreader 84 be omitted when desired, but the auxiliary skirts 56 and 58 also can be removed simply by removing bolts 59. This uncovers the balance of the wide opening at the rear of the mower housing so that no windrow will be formed. The apparatus then can be used, with or without the central baffle unit in place, in carrying on conventional mowing operations. If the central baffle unit is not desired, it is only necessary to remove bolts 64 and 72, after which tongue 66 can be withdrawn rearwardly from the guideway 68 and thus detached from the mower housing.

From the foregoing, it will be seen that my invention is one well adapted to attain all of the ends and objects hereinbefore set forth, together with other advantages which are obvious and which are inherent to the apparatus.

It will be understood that certain features and subcombinations are of utility and may be employed without reference to other features and subcombinations. This is contemplated by and is within the scope of the appended claims.

Inasmuch as various possible embodiments of the invention can be made without departing from the scope thereof, it is to be understood that all matter herein set forth or shown in the accompanying drawings is to be interpreted as illustrative and not in a limiting sense.

Having thus described my invention, I claim:

1. In a power mower
an ambulant open bottom housing having a top deck with depending side walls partially enclosing the space beneath said deck,
the width of said housing from side to side being approximately double the fore-to-aft dimension of the housing,
a pair of rotary cutters in said housing, each having a cutting orbit whose diameter is approximately equal to the fore-to-aft dimension of the housing,
the first of said cutters being rotatable about a vertical axis located approximately midway between the longitudinal center line of the housing and one side thereof,
the second of said cutters being rotatable about a vertical axis located approximately midway between the longitudinal center line of the housing and the other side thereof,
drive means for rotating said cutters in such relatively opposite directions that the extremities of both cutters travel toward the longitudinal center line of the housing as said extremities pass under the rear portion of said housing,
said depending wall of the housing having a discharge opening therein centrally located at the rear of the housing,
and material-directing baffle means depending from said deck forwardly of said opening and extending rearwardly through said opening to a point trailing the rear of said housing, said baffle means dividing said opening into two substantially equal sections located on opposite sides of the longitudinal center line of the housing.

2. In a mower as in claim 1,
a rearwardly flaring wedge shaped material spreader at the rearmost extremity of said baffle means.

3. A power mower as in claim 2,
wherein said spreader is removably attached to said baffle means.

4. A mower as in claim 1,
wherein said baffle means has at its rearmost extremity a vertical socket, said socket being V-shaped in transverse cross section,
and a V-shaped angle member insertable in said socket so that the sides of said member flare rearwardly from said baffle means.

5. A power mower as in claim 1,
wherein said baffle means has a pair of material-directing faces located on opposite sides of the longitudinal center line of the housing,
said faces being spaced apart at their forward extremities and converging rearwardly toward one another.

6. In a power mower as in claim 5,
a rearwardly flaring wedge shaped material spreader at the rearmost extremity of said baffle means.

7. A power mower as in claim 6,
wherein said spreader is removably attached to said baffle means.

8. A mower as in claim 5,
wherein said baffle means has at its rearmost extremity a vertical socket, said socket being V-shaped in transverse cross section,
and a V-shaped angle member removably received in said socket so that the sides of said member flare rearwardly from said baffle means.

9. In a power mower
an ambulant open bottom housing having a top deck with depending side walls partially enclosing the space beneath said deck,
the width of said housing from side to side being approximately double the fore-to-aft dimension of the housing, a pair of rotary cutters in said housing, each having a cutting orbit whose diameter is approximately equal to the fore-to-aft dimension of the housing,
 the first of said cutters being rotatable about a vertical axis located approximately midway between the longitudinal center line of the housing and one side thereof,
 the second of said cutters being rotatable about a vertical axis located approximately midway between the longitudinal center line of the housing and the other side thereof,
drive means for rotating said cutters in such relatively opposite directions that the extremities of both cutters travel toward the longitudinal center line of the housing as said extremities pass under the rear portion of said housing,
said depending wall of the housing having a discharge opening therein centrally located at the rear of the housing,
said deck having a guideway extending horizontally forward from the rear of the housing along the center line of the housing,
an elongate tongue slidably received in said guideway,
means for removably securing said tongue in said guideway so that a portion of the tongue projects rearwardly from the housing,
and depending baffle means secured to the projecting portion of the tongue and extending forwardly therefrom through said discharge opening to a point adjacent to the orbits of said cutters.

10. A mower as in claim 9,
wherein said baffle means comprises a pair of baffle plates carried by said tongue in such canted relation thereto that the two plates are spaced farther apart at their forward ends than at their rear ends.

11. In a mower as in claim 10,
a pair of rearwardly flaring fins detachably mounted on said baffle means at the rearmost extremity thereof and forming extensions of the respective baffle plates.

12. In a mower as in claim 10,
a downwardly extending post on the projecting portion of said tongue,
and a ground skid on the lower end of said post, said skid being below the level of the lower edges of said baffle plates.

13. In a power mower of the type having a pair of rotary cutters which are rotatable about laterally spaced vertical axes,
 a housing for said cutters having a pair of material discharge chutes associated respectively with the two cutters,
said chutes being side by side at the rear of the housing with the forward end of each chute adjacent to the orbit of its associated cutter,
the proximate walls of the two chutes convering rearwardly whereby material discharged from the two chutes joins to form a single windrow,
and drive means for rotating said cutters in such relatively opposite directions that the extremities of the cutters travel toward the longitudinal center line of the housing as said extremities pass under the rear portion of said housing.

14. A mower as in claim 13,
wherein the walls of each discharge chute converge rearwardly toward the center line of that chute, the angle between the center line of one chute and the center line of the other being approximately 60°.

15. In a power mower of the type having a pair of rotary cutters which are rotatable about laterally spaced vertical axes,
 a housing for said cutters having a pair of material discharge chutes associated respectively with the two cutters,
said chutes being located side by side at the rear of the housing with the forward end of each chute adjacent to the orbit of its associated cutter,
the proximate walls of the respective chutes converging rearwardly whereby material discharged from the two chutes joins to form a single windrow,
means joining the rearmost extremities of the proximate walls of the respective chutes,
and a rearwardly flaring wedge-shaped spreader carried by said walls at the rearmost extremity thereof.

16. A mower as in claim 15,
wherein said spreader is removably supported on said proximate walls.

17. In a power mower of the type having a pair of rotary cutters which are rotatable about laterally spaced vertical axes,
 a housing for said cutters having a first material discharge chute for one cutter and a second material discharge chute for the other cutter,
said chutes being located at the rear of the housing and each having a pair of laterally spaced rearwardly converging walls whereby the rear end of each chute is narrower than the forward end,
the center line of each chute being approximately radial to the axis of the associated rotary cutter,
the rear ends of the two chutes being side-by-side and immediately adjacent to one another,
and the forward ends of the two chutes being spaced laterally apart from one another.

18. A mower as in claim 17,
wherein the distal walls of said chutes have at their forward ends integral arcuate skirts extending laterally and forwardly away from one another, one skirt being concentric with the orbit of one cutting rotor and the other skirt being concentric with the orbit of the other cutting rotor, and each skirt having along its lower edge an integral horizontal flange underlying the orbit of the associated cutting rotor.

19. A mower as in claim 18,
wherein each skirt and its integral chute wall are detachably mounted on said housing.

References Cited in the file of this patent
UNITED STATES PATENTS

| | | |
|---|---|---|
| 2,964,896 | Finocchiaro | Dec. 20, 1960 |
| 3,015,927 | Caldwell | Jan. 9, 1962 |
| 3,037,341 | Collins | June 5, 1962 |
| 3,068,630 | Caldwell | Dec. 18, 1962 |